United States Patent [19]

Gallup et al.

[11] Patent Number: 5,240,687
[45] Date of Patent: * Aug. 31, 1993

[54] BRINE TREATMENT

[75] Inventors: Darrell L. Gallup, Chino Hills; Allen W. Doty, Pomona; Morton M. Wong, Placentia; Charles F. Wong, Yorba Linda; John L. Featherstone; Jessie P. Reverente, both of El Centro; Philip H. Messer, Palm Desert, all of Calif.

[73] Assignee: Union Oil Company of California, Los Angeles, Calif.

[*] Notice: The portion of the term of this patent subsequent to Sep. 8, 2009 has been disclaimed.

[21] Appl. No.: 843,169

[22] Filed: Feb. 28, 1992

Related U.S. Application Data

[63] Continuation-in-part of Ser. No. 213,770, Jun. 30, 1988, abandoned, which is a continuation of Ser. No. 761,183, Jul. 31, 1985, abandoned, and a continuation of Ser. No. 458,886, Dec. 29, 1989, Pat. No. 5,145,515, which is a continuation-in-part of Ser. No. 345,167, May 1, 1989, Pat. No. 5,082,492, and a continuation of Ser. No. 559,042, Jul. 26, 1990, Pat. No. 5,145,656.

[51] Int. Cl.⁵ .............................................. C22B 3/44
[52] U.S. Cl. ........................................ 423/42; 75/712; 75/726; 75/732; 75/736
[58] Field of Search ................... 423/42, DIG. 19; 75/712, 726, 724, 732, 733, 736, 744; 266/170; 60/641.2

[56] References Cited

U.S. PATENT DOCUMENTS

| | | | |
|---|---|---|---|
| 3,394,064 | 7/1968 | Fowkes | 204/150 |
| 3,476,663 | 1/1969 | Norris | 204/151 |
| 3,605,290 | 9/1971 | Ransom | 266/22 |
| 3,686,092 | 5/1971 | Stehlin | 204/197 |
| 3,744,955 | 7/1973 | MacKay | 266/170 |
| 3,792,845 | 2/1974 | Larson | 266/22 |
| 3,840,217 | 10/1974 | McKay | 266/170 |
| 3,928,155 | 12/1975 | Woodhouse | 204/150 |
| 4,033,763 | 7/1977 | Markes | 75/418 |
| 4,039,407 | 8/1977 | Kelleher | 204/109 |
| 4,119,303 | 10/1978 | Kellerwessel | 75/418 |
| 4,127,989 | 12/1978 | Mickelson | 60/641 |
| 4,204,617 | 12/1980 | McKay | 266/22 |
| 4,273,631 | 6/1981 | Layton et al. | 204/109 |
| 4,280,884 | 7/1981 | Babb et al. | 204/109 |
| 4,331,473 | 5/1982 | King | 75/713 |
| 4,429,535 | 2/1984 | Featherstone | 60/641.5 |
| 4,441,697 | 4/1984 | Peterson | 266/170 |
| 4,494,986 | 1/1985 | Forsman | 75/388 |
| 4,602,820 | 7/1986 | Hard | 75/712 |
| 4,728,432 | 3/1988 | Featherstone et al. | 60/641.5 |
| 4,756,888 | 7/1988 | Gallup | 423/42 |
| 4,967,559 | 11/1990 | Johnston | 423/DIG. 19 |
| 5,082,492 | 1/1992 | Gallup et al. | 75/712 |
| 5,145,515 | 9/1992 | Gallup et al. | 75/712 |

OTHER PUBLICATIONS

"Sulfide Precipitation of Heavy Metals From High Salinity Brine" by Bartlett et al. at pp. 39–42 of Transactions, vol. 3, Sep. 1979, G.R.C.

"Extraction of Gold and Silver from Geothermal Fluid" by Brown et al., at pp. 161–163 of Proceedings of 10th New Zealand Geothermal Workshop, 1988, GRC.

Primary Examiner—John Niebling
Assistant Examiner—Brian M. Bolam
Attorney, Agent, or Firm—Gregory F. Wirzbicki; William O. Jacobson

[57] ABSTRACT

Geothermal brine is passed through a zone containing a packing metal so as to reduce its tendency to deposit iron/silica scale, reduce corrosivity of the brine, and/or remove and recover metals from the brine. The method polishes the geothermal brine by contacting the brine with a packing metal higher in the electromotive series than silver for a time sufficient for a precious metals to precipitate onto the packing at brine temperature and pH conditions which inhibit iron-rich silica scale. Most preferably, the contacting is accomplished near an injection well at the end of a heat extraction process and the packing comprises coiled zinc-galvanized steel chicken wire mesh packed in a sufficient density to also act as a filter for suspended particles. Alternatively, contacting is also accomplished near the production well. Dissolving the packing in a suitable acid leaves a precious metal-rich residue behind for subsequent recovery. When the brine is treated in accordance with this method, the useful life of injection wells used to return cooled brine back to the geothermal field is extended by at least about 3 time as compared to that observed with untreated brine. Further the contacted brine is less corrosive than it was before contacting.

43 Claims, 2 Drawing Sheets

Fig. 4.

BRINE TREATMENT

CLAIM OF PRIORITY, INCORPORATION BY REFERENCE

This application is a continuation in part of: (1) application Ser. No. 07/213,770 filed on Jun. 30, 1988 now abandoned which is continuation of application Ser. No. 761,183 filed on Jul. 31, 1985; and (2) application Ser. No. 07/458,886 filed on Dec. 29, 1989 now U.S. Pat. No. 5,145,505 which is a continuation in part of application Ser. No. 07/345,167 filed on May 1, 1989 now U.S. Pat. No. 5,082,491 and a continuation of Ser. No. 07/559,042 filed Jul. 26, 190 now U.S. Pat. No. 5,145,65. The teachings of all of these five prior filed applications are incorporated in their entirety herein by reference.

FIELD OF THE INVENTION

This invention relates to the treatment of a hot aqueous brine solution containing various dissolved components which may have scaling and corrosive tendencies. The dissolved brine components can include iron and silica, but also can include more valuable metal components, such as silver, antimony and gold. The invention relates to inhibiting precipitation of undesirable scale, such as iron silicate scale, while enhancing deposition and recovery of a valuable metal-containing scale. More particularly, the invention relates to such a treatment of a geothermal brine from a reservoir which is processed to recover a portion of the brine's heat content. The processed brine is injected back into the geothermal reservoir. The invention also relates to a method for reducing the corrosivity of such brine.

BACKGROUND

The solubility of most ions in solution decreases with a decrease in temperature and pressure of the solution. If dissolved ions are present near their saturation concentration in the solution, a slight reduction in the temperature or pressure of the system can result in precipitation of a portion of these ions. Precipitates can combine and deposit as a scale on any solid surface with which they come into contact, such as the vessel or conduit in which the solution is confined.

One example of such a solution is a geothermal brine which is flashed at least in part to steam in a power plant or industrial process. This flashing is often accompanied by the formation of scale on the surfaces contacted by the fluid stream. Scale deposits tend to build up over a period of time and restrict further fluid flow. In extreme cases, conduits can become completely plugged with scale and the industrial operation must be shut down for maintenance.

Typically, salts and oxides of heavy metals, such as lead, zinc, iron, silver, cadmium and molybdenum, are found in geothermal brine. Other more common minerals, such as calcium and sodium, are also dissolved in the brine, as are naturally occurring gases, including carbon dioxide, hydrogen sulfide and methane.

An especially troublesome component of the hot brine may be silica, which may be found near saturation concentrations in the form of silicic acid oligomers. These tend to precipitate out at almost every stage of brine processing, either as substantially pure silica or as a tightly adherent metal-silica scale. Silica rich scale/precipitation, especially that which forms at lower temperatures, has little or no commercial value because little of the valuable metals are present. Typically, this "natural" precipitation from temperature and pressure reduction removes less than one percent by weight of the valuable metals present. If this troublesome "natural" scale is not removed, or prevented from forming, serious problems can arise with conduit plugging. Even when the brine has completed its passage through the plant, it typically retains some amount of scale/precipitation forming tendencies, which if not removed, will eventually result in the plugging of the injection wells used to return the now cooled brine to the geothermal field.

Various proposals have been made to decrease the scale formation in equipment used in producing and handling geothermal brine. In "Field Evaluation of Scale Control Methods: Acidification," by J. Z. Grens et al, Lawrence Livermore Laboratory, Geothermal Resources Council, Transactions, Vol. 1, May 1977, there is described an investigation of the scaling of turbine components wherein a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.). In the nozzles, the primary scale was heavy metal sulfides, such as lead sulfide, copper-iron sulfide, zinc sulfide and cuprous sulfide. Thin basal layers of fine-grained, iron-rich amorphous silica appeared to promote the adherence of the primary scale to the metal substrate. By contrast, the scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was eliminated. However, such acidification of hot brines increases the corrosion of the brine-handling conduits and equipment.

It also is known to recover metal values and salts from brine, such as geothermal brine produced from a subterranean reservoir. U. S. Pat. No. 4,127,989 to Michelson discloses a method in which brine is pressurized and maintained above the bubble point pressure and thereafter a precipitating agent, such as a soluble sulfide, is added to the brine to enhance formation of insoluble metal sulfide precipitates. Soluble salts and metal values are recovered from the brine effluent after the hot brine has been processed to recover energy therefrom. Silver sulfides are among the mineral values recovered by this process.

Moreover, the treated brine must be particle-free after the metal recovery process for injection into the reservoir. In addition, the treated brine must be compatible with the reservoir, e.g., the treated brine must not adversely react with the reservoir formation when the brine is injected. This may render a precipitating agent addition metal recovery process unsuitable for application to geothermal brine which is returned to the resevoir formation, unless the precipitating) agent is neutralized prior to injection. Neutralization may require costly amounts of reagents, process materials, and equipment, such as pH control and filtration of the entire flow of brine.

Still further, treatments can cause corrosion or other fluid handling problems. Other problems can include the introduction of oxygen (e.g., along with the precipitating agent) into the otherwise oxygen-free brine, contamination of heat recovery processes, and embrittlement of equipment.

While the aforementioned geothermal brine treatments have met with some success in particular applications, the need exists for a further improved treating process to better control the scaling during (thermal) energy recovery and injection processes, and to efficiently recover valuable mineral values in geothermal brines.

Accordingly, it is the object of this invention to provide an improved method for recovering valuable precious metal-containing scales from geothermal brines, inhibiting the overall precipitation of scale, particularly iron-silicate scale, inhibiting corrosion, and polishing the geothermal fluid so as to prevent the transport of residual silica and other particulate material suspended therein to an injection well.

Other objects, advantages and features of the invention will be apparent from the following description, drawings and appended claims.

SUMMARY OF THE INVENTION

The present invention provides a method for inhibiting the deposition of iron silicate and other scales from a geothermal brine and treating the brine to stabilize suspended silica and/or other dissolved components therein, while promoting the recovery of silver and other precious metals in the brine in a brine heat recovery process. The invention further provides a method for reducing the corrosivity of the brine.

In the present invention, the feed of a brine cooling process is preferably a geothermal brine at an elevated temperature and containing precious metals (such as silver, gold and platinum), trivalent metal ions (especially those of iron and manganese), and silica species dissolved or suspended therein. If the brine cooling process extracts thermal energy by flashing and inhibiting treatment is placed downstream of the flashing, the brine is acidified with a water-soluble acid if required to maintain a brine pH of about 5 at the lower (post-flash) temperatures. The acid is typically added in an amount sufficient to lower the pH between about 0.1 and about 0.5 pH units of the lower temperature brine.

The brine (before or after flashing) is passed through a contacting or collection spool containing one or more metals higher in the electromotive series than silver. The metal with which the brine is contacted in the spool may take any convenient form, e.g., angle iron, steel flakes, or balls, but preferably is a coiled galvanized wire. The overall formation of scale downstream of the spool, especially iron silicate scale, is inhibited and corrosion is minimized. In addition, a substantial proportion of the precious metals in the brine precipitates out in the contacting spool.

The brine may be metal contacted just prior to flashing (i.e., at high temperature) if protection of the flashing process equipment os a primary objective. Metal contacting after flashing and just prior to being injected into an injection well for disposal (i.e., at lower temperature) is preferred if protection of the injection well is a primary objective. The contacting metal may be in a form adapted to also filter any particles of scale suspended in the brine at the time of treatment, such as a coiled wire packing in a removable spool. If both high temperature and lower temperature brine are metal contacted, both corrosion and scale deposition in the flash process, downstream piping and injection well are substantially reduced. The scale which forms on the contacting metal at high and lower temperature locations is enriched in precious metals and inhibits corrosive and general scaling downstream of the contacting spool.

The precious metals deposited on the packing tends to be brittle and may be recovered by a variety of methods. Where coiled steel wire is used as the packing medium, a precious metals-rich scale may be recovered by metal distortion or dissolving the steel wire substrate in hydrochloric acid. Where angle iron or balls are used as the packing medium, precious metals-rich scale may be recovered by impact tumbling the packing and separating the dislodged scale.

BRIEF DESCRIPTION OF THE DRAWINGS

The present invention will be more readily understood by reference to the Figures.

DETAILED DESCRIPTION OF THE PREFERRED EMBODIMENT

In producing and utilizing hot pressurized aqueous solutions which contain dissolved metal salts at or near their saturation concentration, a reduction in pressure and/or temperature of the solutions causes a portion of the metal salts to precipitate and deposit as scale on the surfaces of the vessel or conduit confining the brine. Examples of such hot pressurized brine solutions include geothermal brines and other brines used in a wide variety of industrial operations. A number of different types of scale can form depending on the nature and concentration of the metal salts in solution. Many of these scales are soluble in an acid solution and acid addition has been used to inhibit scale forming tendencies.

However, the addition of acid into the system usually results in severe corrosion of the ferrous metals normally used in the manufacture of the confining vessels and conduits, particularly when the brine is at a high temperature, for example, 500° F. While corrosion inhibitors are known, these inhibitors do not function well or are uneconomical under the severe temperature and other conditions of many geothermal systems. Thus, the use of acid to inhibit or dissolve such scale has been limited and most often is confined to systems employing expensive corrosion resistant metals.

Brines from geothermal wells generally contain silver in a concentration up to about 0.4 ppm by weight, with the typical concentration in a given brine usually being between about 0.1 and 0.7 and most typically between about 0.2 and 0.4 ppmw. For a brine containing 0.4 ppm silver by weight, assuming production is 144 million pounds of brine per day as for a typical 50-megawatt plant, the possible daily silver production of about 840 troy ounces provides great incentive for its recovery.

It has been discovered that the silver produced in geothermal brine can be easily recovered at little expense using a metal-contacting collection spool under certain conditions. The need for additional filtering of the brine before injection or for frequent scale removal shutdown of downstream piping and facilities is avoided by inserting at least one collection spool into one or more conduits located at some point in the surface brine handling equipment.

Two embodiments of the invention will be described herein, a high temperature and a lower temperature embodiment within a brine flash type of geothermal energy extraction process. The high temperature embodiment places a reactive metal contacting spool near the source of the feed brine, e.g., near the geothermal brine production well or initial separator. This high temperature placement primarily protects the downstream flash process piping and equipment. Subsequent brine temperature lowering (e.g., flashing) may supersaturate scaling constituents are require additional treatment. The lower temperature embodiment places a reactive metal contacting spool downstream of the flash process, e.g., near the final flash vessel or injection well. This lower temperature placement primarily protect the injection piping and well. Other placements would tend to protect other portions of brine handling piping and equipment downstream of the metal contacting spool. The preferred embodiment is at least one lower temperature spool located to maximize scaling and corrosion protection of the injection well(s).

HIGH TEMPERATURE EMBODIMENT

The high temperature collection spool tends to be located just downstream of the wellhead separator vessel, i.e., located downstream of the production well but before the majority of surface thermal energy extraction or brine temperature lowering is accomplished). At least one of the lower temperature collection spools tends to be located upstream of the injection wells (i.e., after the majority of brine temperature lowering).

Figures 1, 2, 3:
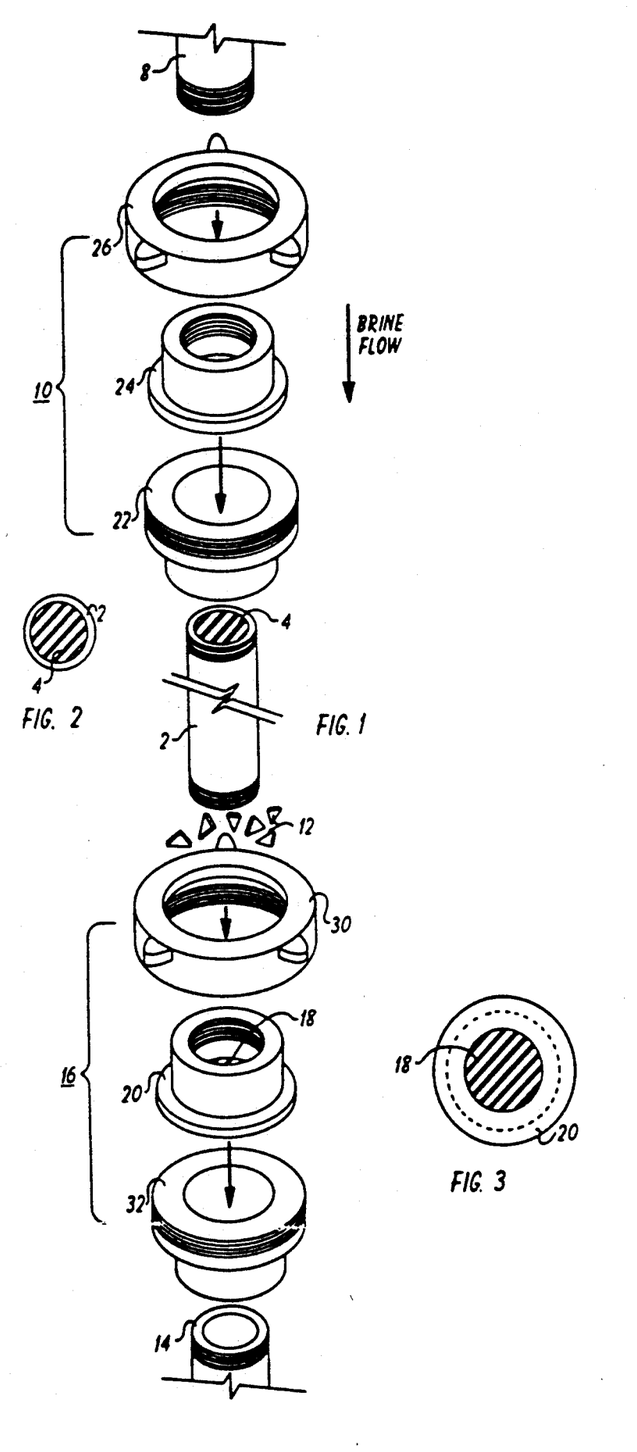
FIG. 1 shows an exploded view of the collection spool.
FIG. 2 shows a retaining grate covering the end of the collection spool.
FIG. 3 shows a removable retainer grate that abuts against the opposite end of the collection spool.

As shown in the FIGS. 1-3, a high temperature collection spool is located near or downstream of the production well. The spool generally comprises a section of conduit 2 having retainer grates 4 and 18 at each end to form a flow-through cage. The interior of the cage is packed with various shapes and sizes of iron-bearing packing material and is inserted into the brine-carrying conduits so that the brine flowing through the conduit passes through the high temperature collection spool.

Generally, the diameter of the high temperature collection spool is about equal to that of the surface conduit into which it is inserted. However, the diameter of the high temperature collection spool can be either larger or smaller than that of the surface conduit so long as the fluid passing through the high temperature collection spool is in turbulent, preferably two-phase flow.

In the preferred high temperature embodiment, as shown in the drawing, one end of conduit section 2 is covered by flow-through retainer grate 4, which is permanently affixed thereto by welding. This end of the high temperature collection spool is joined into surface conduit 8 by union 10, comprised of bisections 22 and 24 and collar 26. Union 10 is a 3000 pound forged steel handle bar union having a 45 degree cone to ball metal to metal seating. The opposite end of conduit section 2 is not permanently covered, but is left open so that packing material 12 ca be readily inserted and removed to recover the silver-containing scale therefrom.

This end of conduit section 2 is connected to surface conduit 14 by means of union 16, a 3000 pound forged steel handle bar union having a 45 degree cone to ball metal to metal seating. Union 16 is comprised of bisections 20 and 32 and collar 30 having retainer grate 18 welded to bisection 20 of union 16, which fits over the open end of conduit 2 so that grate 18 abuts against the open end of conduit section 2 to hold the packing material in place therein. Therefore, to recover the valuable metals, the high temperature collection spool is removed from its position in the liquid handling equipment, unions 10 and 16 are disengaged from conduits 8 and 14, and bisection 20, to which retainer grate 18 is welded, is removed from the open end of conduit section 2. Packing material 12 can then be removed from the open end of conduit section 2.

Packing material 12 comprises pieces of an iron-bearing metal having shapes which when packed within the high temperature collection spool will present sufficient surface area for deposition of the metal-containing scale while also creating turbulence in the fluid flow and possessing sufficient physical strength to maintain such fluid flow conditions in the high temperature collection spool. Usually the pressure drop across the collection spool is initially no more than 10 p.s.i. but will gradually increase as scale collects on the packing pieces.

Due to the low concentrations of silver in geothermal brine, mass and electron transport mechanisms for silver deposition are diffuse and slow. The flow-through design of the high temperature collection spool provides turbulent conditions at the iron-brine interface and thereby promotes the mass transport and electron transport necessary for silver deposition. It has been found that metal recovery is also enhanced by providing a packing material that promotes turbulence and has a slightly roughened or porous surface rather than a polished surface.

To ensure that the packing material within the high temperature collection spool is reusable and will not disintegrate during use, it is preferred that the packing material have sufficient strength to withstand substantial impact, as when pieces of the metal are tumbled in a container subjected to violent tumbling motion to dislodge the silver-containing scale for recovery. Preferably the packing material comprises pieces of half-inch to one-inch angle iron stock cut into lengths of between about one-half and one and one-half inches. Alternatively, the packing material can be pieces of iron ring between about one-half and one and one-half inches in length having a nominal outside diameter of between about one-half and one and one-half inches.

In the practice of this high temperature embodiment of the invention, it is preferred that the spool and operating conditions be such that the brine is a two-phase flow upon entering the spool and is a turbulent flow passing through the packing material. Although the conditions which determine two phase flow will vary from installation to installation, it has been found that geothermal brines from the Salton Sea area of California are typically produced at a wellhead separator pressure of between about 350 and 400 p.s.i.g. and temperature between about 425° and 450° F. The separated brines at these conditions will further flash to produce two-phase brine when pressure and temperature of the brine are reduced to about 150 p.s.i.g. and between about 350° and 400° F., respectively. If necessary to separate the two-phase flow, the brine is flashed before entry into the high temperature collection spool and the diameter of the brine flow conduit is increased immediately ahead of the high temperature collection spool.

The form of the metal packing and the vapor phase of the high pressure and high temperature brine in the collection spool helps to enhance the turbulence necessary to facilitate deposition of silver and other precious metals.

However, it has been found that at lower pressures (and corresponding lower temperatures) in the collection spool, for example at 90, 75, or 50 p.s.i.g., the amount of silver recovered is reduced unless other spool and system configuration changes are incorporated (see later discussed lower temperature embodiment). Accordingly, for highest recovery and process system scaling protection, the pressure in a high temperature collection spool should be maintained as high as is consistent with turbulent, two-phase flow within the collection spool and power plant conversion efficiency.

For best results this high temperature process for recovering metals is conducted in a reducing environment. In the case of high temperature geothermal embodiments, a sufficient reducing environment can be maintained by keeping the brine pressure and unexposed to air upstream of the high temperature collection spool. It is believed that exposure to air promotes formation of iron oxide in a reaction that competes with the galvanic reaction for silver deposition. Formation of iron oxide accelerates the rate at which iron is consumed, so that the packing material must be replaced more frequently in an oxidizing than in a reducing environment. Moreover, formation of iron oxide decreases the amount of valuable metals recovered from the brine and accelerates deposition of undesired, non-silver-bearing scale.

In use, as the two-phase brine from the separator and surface conduit flows through the high temperature collection spool, interaction between metals dissolved in the brine and iron in the packing material causes the metals to adhere as scales to the surfaces of the packing material. Generally, the scales which collect upon the metal packing material contain silver, antimony, arsenic, copper, and gold.

When treating geothermal brine from the Salton Sea area in the practice of this near production well (i.e., high temperature) embodiment of the invention, silver, silver chloride, and silver-antimony or silver-arsenic compounds collect on the surfaces of the packing material within the high temperature collection spool. It is believed that the mechanism by which silver, silver-antimony and silver-arsenic compounds are recovered is a galvanic reaction involving oxidation of iron as the anodic reaction and reduction of soluble silver, antimony and arsenic as the cathodic reaction. Although the reaction potential under the geothermal high temperature spool conditions are not known, under standard conditions (1 atm. and 32° F.) silver reduction provides a favorable reaction potential of a little over two volts relative to the oxidation potential of hydrogen as zero. Silver chloride precipitated in the scale is believed to be due to the limited solubility of silver chloride.

Although the exact mechanism of high temperature collection spool deposition of valuable metal enriched scale and inhibition of less valuable downstream scale is unknown and the claims hereinafter set forth are in no way limited by the chemical reactions involved in deposition, it is believed that the following overall reaction is involved in silver deposition:

Formation of silver-antimony and silver-arsenic compounds from components contained in geothermal brines increases the overall recovery of silver in the practice of this invention. The free energies of reaction for the formation of these compounds using the galvanic model are also extremely favorable. For antimony, the anodic reaction is the oxidation of iron and the cathodic reaction is the reduction of silver ion and antimony ion to form dyscrasite ($Ag_3Sb$). For arsenic, the half reactions are probably similar. Although the exact mechanisms of high temperature collection spool deposition are unknown, a plausible overall reaction for the formation of dyscrasite is as follows:

To recover the silver-containing solids from the high temperature collection spool, the high temperature collection spool is removed from its location within the surface conduit. If two or more high temperature collection spools (e.g., a second 100% capacity train having an auxiliary high temperature collection spool) have been placed in parallel in the surface piping to allow for continuous operation while the precious metal enriched scales of one spool are removed, the flow of brine from the wellhead is switched from the spool to be removed to the auxiliary. Then the spool that contains scales is removed from its location in the surface piping, and the scale-bearing pieces of packing material are typically removed from the high temperature collection spool, placed in a vessel such as a closed container or cement mixer, and tumbled, preferably using a vigorous tumbling action. While any method of agitation sufficient to knock or dislodge scale from the packing material can be used, it has been found that end-to-end tumbling of an elongated vessel containing the packing material, or equally vigorous, rotary tumbling action is usually required to provide sufficient force to knock the deposits of scale from the angle iron or other packing material.

Alternatively, the scales can be dislodged or washed from the packing material with hydrochloric acid. However, when the scales contain antimony and arsenic, as is usually the case, care must be taken since contacting the scales with hydrochloric acid will result in formation of stibine and arsine, both of which are colorless, poisonous gases.

Once the metal-containing scale has been dislodged from the packing material, the valuable metals can be separated from the scale by known methods. For instance, for the recovery of silver, the scale is dissolved in cyanide solution with aeration, and silver is selectively precipitated by contact with zinc or recovered from the solution by electrolysis.

Typically, in the practice of this invention the percent recovery of the silver contained in geothermal brine depends upon the concentration of silver therein. The recovery will also depend upon the length of the high temperature collection spool or number of collection spools used in series. Recovery of valuable metals such as silver typically will be at least 20 percent. For instance, from brine containing 0.2 ppmw of silver, the recovery ranges between about 20 percent for a single high temperature collection spool of 24 inches length and about 28.4 percent for two such collection spools used in series.

Although geothermal brine contains silver in concentrations as low as about 0.2 part per million of total brine, recovery of up to about 28 percent or higher of the silver is possible using the high temperature collection spool embodiment of this invention. Therefore, it is a particular advantage of this invention that valuable metals present in an aqueous stream in low concentrations can be easily and economically recovered with a high degree of efficiency.

Moreover, the preferred packing materials used in the high temperature spool, pieces of angle iron or iron ring, possess the particular advantage of low cost while promoting constant turbulent brine flow. And since the preferred packing materials have the strength to withstand the vigorous tumbling needed to dislodge metal-containing scale, the packing material is reusable.

Yet another advantage of collecting precious metals by the process and apparatus of this invention is that no additional downstream filtering of the brine is required to remove the contact metal from the process stream before injecting brine into the reservoir, as may be needed if unrestrained steel wool or iron filings serve as a high temperature contact metal. Since filters create a relatively large pressure drop, avoiding their use obviates costly pumps and the energy required for their operation and maintains high operating efficiency of the metals recovery and energy recovery operations.

LOWER TEMPERATURE EMBODIMENT

For application of the invention to downstream or lower temperature (after a major portion of the brine heat extraction and temperature reduction in surface process facilities has occurred) portions of a power plant, the pH of the lower temperature brine is preferably reduced and lower temperature collection spool pieces are configured to more effectively filter the brine. In addition, the brine handling system is composed of materials capable of withstanding the reduced pH fluid. The lower temperature embodiment adapt the invention to the sensitivity of injection wells to scale and suspended solids, brine temperature and constituent changes caused by flashing, and scale constituent changes which occur during the flash process.

The concentration of ferric and trivalent manganese ions, and silica species contributed by iron, manganese and silica containing minerals dissolved from the reservoir by the hot brine, is normally near saturation so that the silicates of these metals are among the most pervasive and troublesome scales formed in the equipment used to handle and process geothermal brines, especially at lower temperature conditions. In particular, it is important that these and other heavy metal lower temperature scale forming entities be removed or otherwise stabilized so that, when the brine is to be injected back into the geothermal reservoir or pool, scaling will not occur in the injection well. A failure to do so often results in these scale entities being deposited in the well bore and greatly increasing the resistance to flow therein.

In one brine flash process, pressurized brine flashing is continued down to near atmospheric pressure. This lowers the temperature to nearly the atmospheric boiling point of the brine and allows thin wall vessels, such as clarifiers and sand filters, to treat the relatively low temperature brine prior to injection. In a second flash process, brine treatment is by means of pH reducing acid addition, which does not require the brine to be flashed down to atmospheric pressure. Thus, the temperature of the injected pH modified brine is lowered, but not as much as the first brine flash process. Other brine flash processes may flash the brine to sub-atmospheric pressures, still further lowering the brine temperature.

Figure 4:
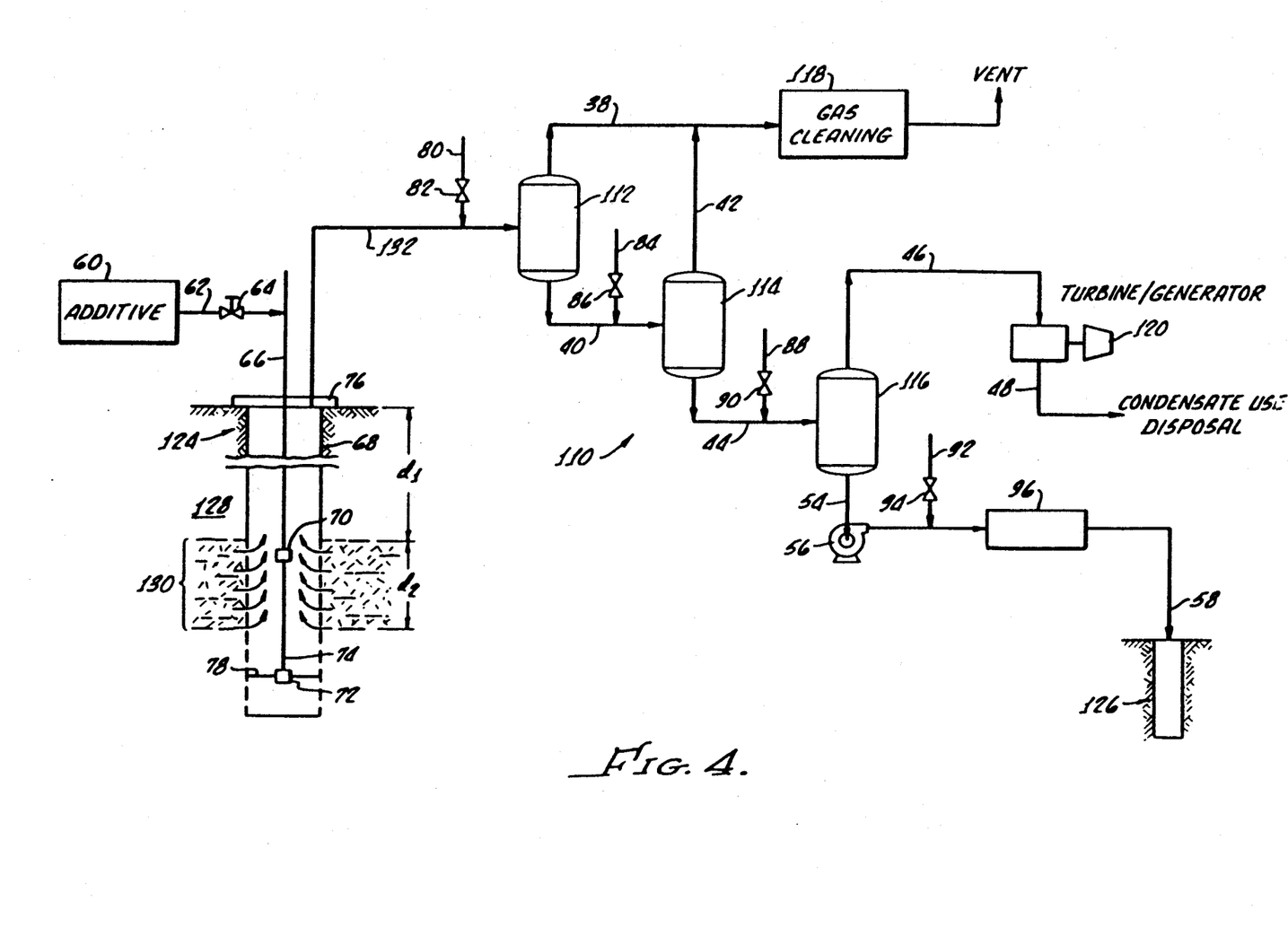
FIG. 4 shows in diagram form, relevant portions of an exemplary geothermal brine production well and power plant with which the method of the present invention may be used to advantage. It will be understood that like elements in the drawings are referred to by the same reference numerals.

In the preferred acid addition or modified pH flash process, the pH may be reduced by acid addition at several locations to inhibit scaling throughout the process (as shown in FIG. 4 and later described). Alternatively, acid or other additive may also be introduced only at one lower brine temperature condition.

However, corrosion of brine handling components may be accelerated by the addition of scale-inhibiting acid even if the acid is added under conditions of lower temperatures. The corrosion of ferrous metals caused by an excessive addition of acid to the system further increases the concentration of ferric ions potentially available to form these troublesome scales (e.g., in the formation). Therefore, any acid addition must be carefully controlled to limit excessive acid addition and/or brine handling components composed of corrosion resistant materials may be required.

It has now been found that lower temperature scale formation from brine can be decreased, precious metals recovery enhanced, and silica and scale previously formed and still suspended in the brine can be removed, prior to deep-well injection of the brine by adding thereto a brine-soluble acid in an amount sufficient to lower the pH of the brine to below, preferably just below about 5.0, (i.e., to about 4.9), just prior to passing the brine through a contactor packed with one or more metals higher in the electromotive series than silver, and preferably higher than copper. Typically, the processed brine has a pH such that the required pH reduction is between about 0.1 and about 0.5 pH units. Generally, about 20 to about 180 weight parts per million of a water-soluble acid are required. Higher concentrations of the acid can interfere with the activity of certain of the reducing agents listed hereinafter.

While any acid used may be employed in concentrated form, it is common to employ aqueous solutions of such acids. For example, an aqueous solution containing about 31 percent by weight hydrochloric acid is often used. Of course, when the brine solution already has a pH of about 4.9, further acid addition may be omitted.

Acids suitable for use in this invention are inorganic mineral acids, organic carboxylic acids, mixtures thereof, and combinations of inorganic and organic acids. Mineral acids which may be used are hydrochloric, sulfuric, nitric and perchloric acid. Suitable organic carboxylic acids are those that form water-soluble or acid-soluble salts of alkali metals and alkaline earth metals. Aromatic and aliphatic monocarboxylic, dicarboxylic and tricarboxylic acids having about 1 to 6 carbon atoms can also be used. The carboxylic acids can be saturated or unsaturated and substituted or unsubstituted. When a substituted carboxylic acid is used, the most common substituent is the chloride ion. For example, benzoic, formic, acetic, chloroacetic, peracetic, trichloroacetic, citric, oxalic and maleic acids can be used. The most preferred acid is hydrochloric acid.

Even though the reduction in brine pH is controlled, normally one would expect that the acid treated brine solution would have a substantially greater corrosive effect on ferrous metal components downstream of the spool or contactor than it would have had without acid treatment. Surprisingly, just the opposite occurs. Brine treated in accordance with the present invention is actually less corrosive (in spite of the acid addition) than it is before treatment. It is believed that the decreased corrosion rates on the downstream metal conduits and components is related to the removal of ferric iron from the brine as it passes through a metal packing in the lower temperature collection spool. However, other reactions may be taking place in the metal packing to reduce the corrosivity of the brine; therefore, the invention is not to be bound by any particular theory of operation.

To further minimize the scaling and corrosion of downstream metal components, a reducing agent may be added, usually in an amount slightly greater than that stoichiometrically required to reduce any trivalent iron and trivalent manganese cations contained in the fluid stream to divalent cations. As described in Assignee's U.S. Pat. No. 4,765,888, dated Jul. 12, 1988, the teachings of which are incorporated in their entirety herein by reference, the reducing agent decreases scale formation by reducing the number of trivalent iron and manganese cations present in the brine.

As will be discussed and shown in FIG. 4, the acid can be injected from source 60 downhole at producing formation 130 (as close as is practical to its origin) so as to lower the pH of the brine at the wellhead and throughout the power plant via acid addition lines 80, 84, 88 and 92. Without acid addition, the pH of the brine usually increases further as it passes through power plant 110, for example, as non-condensible gases are removed at separators 112 and 114, and as the brine is flashed in vessel 116. Thus, it is preferred to be capable of injecting further quantities of acid into the brine flow throughout the heat extraction process to decrease scaling rates in places where significant pH increases otherwise occur. By so doing, a more uniform brine pH may be achieved. Alternatively, the amount of acid addition and brine pH may be varied according to the amount required at various locations to maintain the pH at a level which will cost effectively minimize scale and corrosion rates at that location in the flash process.

While the acid treatment of the lower temperature embodiment of this invention is effective in reducing the occurrence of a wide variety of scales, of particular importance are metal silicate scales, especially iron silicate scales which tend to predominate in the downstream lower temperature portions of the power plant 110. Such scales are believed to be formed first by the reaction of hydrated ferric oxyhydroxide with silicic acid or silicic acid oligomers, and then subsequent condensation, as follows:

$$OFeOSi(OH)_3 + 2 H_2O \longrightarrow Fe(OH)_3 \cdot SiO_2 + 2 H_2O$$

Further acidizing the already acidic geothermal brine is believed to shift equilibrium conditions away from the formation of a precipitate and/or to interfere with the precipitation reaction involved. The hydrogen ions (H+) added to the brine by addition of further acid are believed to tie up the ferric oxyhydroxide and thereby inhibit the indicated reaction of ferric oxyhydroxide with silicic acid which forms insoluble iron-rich silicates.

The optional addition of reducing agents capable of reducing trivalent iron and trivalent manganese cations is believed to further inhibit the formation of the precipitate by interfering with the formation of ferric and other heavy metal oxyhydroxides. However, regardless of the specific nature of the reaction involved and the specific effects upon the reaction of the acid and reducing agent, it has nevertheless been demonstrated that the method of this invention is effective in reducing the amount of iron-silica scales deposited from geothermal brine and preventing the plugging of injection wells, while inhibiting the corrosion of downstream metal vessels and conduits.

FIG. 4 shows in simplifed schematic form the relevant portions of an exemplary geothermal brine power plant 110 in which the use of a collection spool 96 in accordance with the invention can be used advantageously under low temperature conditions. Generally power plant 110 comprises a first separator 112, a second separator 114 and a flash vessel 116. Shown included in power plant 110 are gas cleaning means 118 and steam turbine generator 120. Associated with power plant 110, but not actually forming a part thereof, are brine extraction well 128 and brine injection well 126. Extraction well 128 penetrates into earth 124 to a depth "$d_1$" within brine producing formation 130 which has a thickness of "$d_2$." Ordinarily, injection well 126 is similar to extraction well 128, and may penetrate to the same producing formation 130.

The downhole apparatus employed in the illustrated method of this invention includes anchor 72 attached to nozzle 70 by connecting rod or conduit 74. Anchor 72 helps maintain the position of nozzle 70 in well 128 during the injection of the acid down conduit 66. Conduit 66 can be a small diameter coiled tubing extending several thousand feet down well 128 from wellhead 76, which in the absence of an anchor 72, would permit nozzle 70 to move about undesirably in well 128. Anchor 72 helps maintain nozzle 70 adjacent to brine producing formation 130, the location where it is desired to inject the mixture of acid and reducing agent into the flow of geothermal brine. For convenience, anchor 72 may be positioned anywhere in the vicinity of nozzle 70.

Since the brine produced from formation 130 may precipitate scale in a lower portion of well 128, anchor 72 is positioned in well 128 below producing formation 130 as shown in the drawing. Anchor 72 can be of any conventional design, for example, an anchor having three or more locking arms 78 which fold up independently as collars while anchor 72 is being lowered downhole. To set locking arms 78 against the formation when the desired depth is reached, conduit 66 is retracted a short distance so that the locking arms unfold. Later, when it is desired to remove nozzle 70 from the well, a stronger upward pull on conduit 66 shears a pin (not shown) in anchor 72, allowing locking arms 78 to collapse and the apparatus to be pulled out of well 128. Since the acid exits conduit 66 via nozzle 70, connecting rod or conduit 74 does not transport any fluid. The purpose of conduit 74 is merely to attach nozzle 70 firmly to anchor 72. Conduit is used in this embodiment to attach the anchor to the nozzle simply because conduit material is readily available and provides mechanical strength.

Since the portion of conduit 66 extending below wellhead 74 is exposed to the high temperature environment of the geothermal fluid being produced, it is preferred that conduit 66 and nozzle 70 be made of a corrosion resistant metal, e.g., stainless steel, Hastelloy, Inconel, or the like. In operation, hot geothermal brine is introduced under pressure from extraction well 128 through conduit 132 into the side region of first separator 112.

The lower temperature brine typically contains supersaturation concentrations of dissolved and/or suspended silica. Consequently, to avoid plugging the brine handling system, the power plant may also include one or more brine clarifiers (not shown) to remove the silica from the brine as it progresses through the plant. In addition, there may also be secondary sand-filters or other means to remove any residual suspended silica and scale prior to injecting the now cooled brine back into the field through well 126. Such systems are shown in U.S. Pat. No. 4,728,438, dated Mar. 1, 1988, the teachings of which are incorporated in their entirety herein by reference.

Within separator 112, non-condensible gases, including hydrogen sulfide, carbon dioxide, and ammonia, are stripped from the hot brine. Second separator 114 may further strip non-condensible gases.

The effective pH of the brine as it enters well 128 from formation 130 is believed typically to be between about 4 and 4.5. However, due to removal of acidic non-condensible gases, the pH of the remaining (liquid phase) brine typically increases to between about 5 and 6 by the time it enters flashing vessel 116. Ordinarily, as the brine enters well 128 from formation 130, flashing occurs to an extent causing release of about 1 to 1.5 percent of steam by wt. of the feed brine, and by the time the remaining brine reaches the top of well 128, additional flashing usually has occurred to an extent that between about 10 and 20 percent of the steam has been released. Brine temperature at producing formation 130 varies considerably from well to well, but is usually in the broad range of from about 350° to about 600° F.

At pH values above about 5.3, the formation of an iron and/or manganese-rich silica scale seems to be accelerated, especially at lower (but still elevated) temperatures. To retard or even prevent the formation of such scale, a small amount of the water soluble acid is injected upstream into brine conduits 132 and 40 through acid conduits 80 and 84. The amount of acid added is typically enough to maintain the pH of the brine in the range of about 5.0 to about 5.3. The non-condensible gases are discharged from the top of separator 112 through gas conduit 38 into gas cleaning means 118 and the brine is discharged from the bottom of separator 112 through conduit 40 into the side region of second separator 114, in which any remaining amounts of non-condensible gases are stripped from the brine. These remaining gases are discharged from second separator 114 through gas conduit 42 into conduit 38, to be directed thereby into gas cleaning means 118. Included in gas cleaning means 118 may be heat exchangers (not shown) which enable heat to be extracted from the hot non-condensible gases to create additional steam from steam condensate in a manner known to those skilled in the art.

From second separator 114, the brine is discharged through conduit 44 into flashing vessel 116. Within flashing vessel 116, the brine is flashed to a substantially lower pressure, for example, from an initial pressure of about 450 p.s.i.g. to the lower pressure of about 50 p.s.i.g., so as to release steam which is routed from vessel 116 through conduit 46 to steam turbine-generator 120. Condensate and/or steam are discharged from turbine-generator 120 through conduit 48 for disposal or for routing to the heat exchangers of gas cleaning means 118. Flashed brine is discharged from flashing vessel 116 through conduit 54 to pump 56 which pumps the brine through conduit 58 into injection well 126. Alternatively, pump 56 may pump the brine to other means of disposal or to other uses (not shown).

In the present process, any convenient means of introducing the acid and, when it is used, the reducing agent to the brine can be used. However, when an acid and reducing agent are selected which evolve gases (e.g., hydrochloric acid and zinc metal, hydrochloric acid and potassium cyanide), care should be taken to avoid unacceptable evolution of gases during the mixing of the acid and reducing agent, for example, by mixing the reducing agent upstream of the acid component or by mixing the reducing agent into a relatively dilute acidic solution. Usually, however, a mixture of acid and reducing agent is introduced from source 60, through conduit 62 containing valve 64 into conduit 66 which extends down well 128, inside of well casing 68, terminating in nozzle 70 positioned approximately opposite brine producing formation 130.

Thus, in addition to being injected downhole, acid either alone, or in combination with a reducing agent, is typically injected (if required to lower the pH) to form a pH modified mixture at the following locations: (1) into brine conduit 132 between wellhead 76 and first separator 112 via conduit 80 containing valve 82; (2) into brine conduit 40 between first and second separators 112 and 114 via conduit 84 containing valve 86; (3) into brine conduit 44 between second separator 114 and flash vessel 116 via conduit 88 containing valve 90; and (4) into conduit 58 just upstream of injection well 126 via conduit 92 containing valve 94. Such injections tend to reduce, if not eliminate, the formation of iron and/or manganese-silicate scale.

The location at which precious metals-containing scale will deposit also depends upon the type of scale-reducing treatment used. In general, scale in geothermal systems forms when the brine is subjected to flashing or other scale-forming conditions wherein a supersaturated solution of dissolved solids forms in a liquid phase, followed by precipitation of scale. In the usual case, with unacidified brine, the constituents of the scale will deposit randomly in the brine handling equipment. Typically, after the brine has passed through all of the flashing to near atmospheric pressure and clarification stages in a geothermal power plant, the residual brine received in conduit 58 for deep-well injection has a temperature of about 220° F., a pH of about 5.2, a suspended solids concentration between about 10 and about 20 ppm and a total dissolved solids content of about 270,000 to about 300,000 ppm, including a silver concentration of about 0.2 to about 1 ppm. Concentrations of gold and platinum, when detected, are typically in the ppb range.

Inhibiting general scaling and concentrating the recovery of the silver (and other precious metals such as gold and platinum, when present) to the sppol(s) can be accomplished when the brine is first acidified to a pH of about 4.9 and then passed through a lower temperature collection spool 96 which is packed with one or more metals at least higher in the electromotive series than silver, and preferably higher than copper, said spool being placed in conduit 58. Preferably, the low temperature collection spool is configured to agitate the low temperature brine flow to assure contacting with the packing metal under turbulent conditions similar to the high temperature embodiment, but two phase flow is no longer preferred.

To accomplish the secondary objective of filtering the brine stream to remove suspended silica and scale particles therein, it is preferred that the packing have a relatively large metal surface area without unduly impeding fluid flow in the conduit. To this end, small ⅛ to ⅜ inch diameter) reactive metal balls, flakes and coiled wire have all been found satisfactory, with coiled piano or "chicken" wire mesh being preferred. While at least some of the precious metals will also deposit out of a brine at a pH above about 5.0, it is found that acidifying the brine to have a controlled pH below about 5.0 just before it contacts the low temperature spool packing, tends to enhance the reaction between the low temperature spool packing and the metal constituents of the brine. To this end, conduit 92 and valve 94 are provided for acid injection upstream of agitation spool 96. Of course if the brine in conduit 58 is already at a pH below 5.0 (an unusual occurrence) no acid need be injected at this time.

The higher electromotive series packing metals used for this lower temperature embodiment, in addition to having higher electromotive potentials than silver, are preferably essentially non-corroding or at least less corroding/brine reactive when exposed to the acidified brine. Thus, metals having negative molal electrode potentials less than about 1.7 Volt (at 25° C.), such as magnesium and aluminum are normally found to be too reactive for this use, while metals having molal electrode potentials greater than −0.5 Volt (at 25° C.) are normally found not reactive enough. Low temperature spool packing metals which are suitable for purposes of this invention include steel and elemental metals such as zinc, iron, nickel, cobalt, cadmium, lead and copper (and suitable alloys thereof), with steel, zinc, and lead being preferred, steel and zinc being more preferred and zinc galvanized mild steel being most preferred.

The lower temperature collection spool 96 preferably comprises a packed conduit configured to provide brine agitation to assure brine-metal contact and also configured sufficiently long to provide a contacting residence time adequate for a substantial proportion, preferably essentially all of the copper, silver and other precious metals therein to precipitate out. For a typical brine in a Salton Sea geothermal plant, this will be accomplished with a residence time of about 2 to 10 minutes, more preferably a residence time of about 2 to about 5 minutes. However, as the precious metal scales form on the packing and as other materials deposit, e.g., silica scale, iron and/or manganese scale and other particulates in the stream deposit thereon, the pressure drop across low temperature spool 96 will increase. Normally, the packing can be left in place until the pressure drop across the packing becomes excessive, i.e. until about a 50% or greater drop in pressure across the spool is observed. When the principal interest is to reduce the corrosivity of the brine, the residence time can be substantially reduced at the cost of reducing the amount of metal recovered.

The silver and other plated metal-enriched scale on the lower temperature packing can be recovered by a variety of methods. For example, iron or steel wire can be easily dissolved in hydrochloric acid, leaving a silver-rich residue which can be refined by conventional smelting operations. Where ball bearings are used, they can be cleaned by milling, with the removed scale being collected for recovery, and the balls being recycled back into the process. In practice, it is recommended that a parallel system be employed so that, when one side is shut down for cleaning, the other side can be utilized without stopping the operation of the geothermal facility.

In use, it is also found that the lower temperature packing will also remove (i.e., filter) at least some of suspended particulate matter in the brine, e.g., silicon containing precipitation which may be in suspension in the brine at this lower temperature location. The amount of particulate removal or filtering is typically in the range of from about 5 to 20 weight percent and more often in the range of 10 to 15 weight percent. A field demonstration also showed a 22 percent decrease in suspended solids. In a pilot plant run in which the discharge from the low temperature spool packed with small steel balls was passed through a 15–20 micron cartridge filter, no problems were observed after 120 hours of operation whereas a similar filter in a line without a packed spool, as hereinabove described, became completely plugged with solids and scale deposition in just 23 hours.

Such a striking difference cannot be explained solely on the basis of the amount of particulates removed. It is believed that the combination of acidifying the brine and then passing it through a packed agitation (i.e., lower temperature) spool, as hereinabove described, polishes the brine by reducing the concentrations of heavy metals therein. As a result, the scale forming constituents of the brine are stabilized such that downstream scale precipitation is substantially reduced, for example, in the filter. Obviously, the deposition of heavy metal-rich scale and nodules in the lower temperature outlet piping 58 (see FIG. 4) and injection well will also be substantially decreased, with the result that the useful life of the injection well will be extended by a factor of from 3 to 5. In addition, the treated brine is substantially less corrosive than would be expected in view of the acid addition. Indeed, the brine leaving the packed lower temperature spool is actually less corrosive than it is upstream of the packed low temperature spool.

In the preferred embodiment, the lower temperature collection spool is packed with coiled steel wire to maximize filtering of suspended particles and combined with an upstream brine handling system which essentially excludes precious metal reacting materials. These non-precious metal reacting materials are also selected to be corrosion resistant to the pH modified brine. This allows the brine pH to, be reduced to control upstream precipitation and scale formation, without severe corrosion of upstream brine handling conduits and process equipment.

The non-reactive, corrosion resistant brine contacting surfaces of the upstream conduits and vessels in this embodiment can be composed of Hastelloy. Lined vessels and conduits, such as polymer concrete lined equipment, can also be used. Other non-precious metal reacting materials of construction include Inconel 625, Incalloy 825, and Ferralliuse 225. The reactive metals constituents of these materials, if present, are bound or otherwise no longer reactive with the precious metal constituents of the brine.

The effect upon the scale/precipitation of placing a precious metal reactive contactor spool at a lower (but still elevated) temperature of at least about 60° C. above ambient pressure brine boiling point temperature and after brine is handled in a non-reactive system is a dramatic increase in precious metal collection effectiveness. The spool will collect a more valuable scale, further enriched in precious metals such as silver and gold. It appears that the upstream pH modification inhibits all scaling until the brine reaches the contacting metal within the spool, such as mild steel. The steel seems to act as a plating cell for the precious metals at brine conditions (e.g., lower, but still elevated temperature) which induce rapid precious metal deposition while the pH modification still inhibits the deposition of silica and other less valuable materials. The pH of the contacted brine is typically acidic and in the range from about 1.0 to 6.0, preferably in the range from about 4.0 to 5.5, most preferably in the range from about 4.5 to 5.0.

Reduced general scaling and corrosivity of the brine downstream of the contactor spool is again observed, even when downstream mild steel conduits are used. The reduced downstream precipitation and corrosion may be related to metal contacting reactions depleting the brine of essentially all supersaturated precious metals and the resulting absence of downstream silica co-precipitation/corrosion reactions. However, other kinetics and reactions may be taking place which enrich the precious metal scale in the spool and reduce the downstream corrosivity and scale; therefore, the invention is not to be bound by any particular theory of operation.

This non-reactive brine handling embodiment achieves a recovery of the silver content of the brine ranging from 2 to 60 percent by wt., gold content of the brine recovery of 0.05 to 0.5 percent by weight, and platinum content of the brine recovery of 0.005 to 0.05 percent by weight. precious metal recovery is also limited to the contactor spool. The contactor scale is enriched with precious metal (typically from about 0.005 to 60 wt. percent) while non-precious solids content is minimized, typically ranging from about 70 to 25 wt. percent. Downstream steel piping corrosion rates without the contactor spool (at about pH 5 brine at injection temperatures ranging from 225° to 350° F.) can range from 50 to 250 mills per year (mpy) while scale rates can range from 2500 to 10,000 mpy. Without the contactor spool, precious metal content of the downstream scale can range from about 0.05 to 0.5 wt. percent. When a contactor spool is used, downstream corrosion rates typically range from 25 to 125 mpy and scaling rates typically range from 500 to 3000 mpy. Downstream scale precious metal content is typically reduced to a range from about 0.01 to 0.2 wt. percent.

The cooled brine temperature at the contactor spool is still significantly elevated. The contactor temperature is within the range from above about ambient to near production well temperatures (i.e., 350° C.), preferably from about brine boiling point temperature at $\frac{1}{2}$ atm to about brine boiling point temperature at 15 atm, most preferably from about ambient pressure boiling point temperature of brine to about 15 atm. pressure brine boiling point temperature.

The following examples are set forth, solely for illustrative purposes, to further demonstrate the advantages obtainable by practice of the present invention. In all instances the brine utilized was obtained from or simulated brine from a Salton Sea geothermal aquifer.

TEST EXAMPLES 1 to 12

A pilot plant test apparatus was set up and operated with clarified brine taken at a rate of about 20 GPM from the overflow, at a temperature of about 220° F. and pressure of about 100 PSI, in a series of tests, each test lasting for up to about 120 hours. For tests 1 through 6, as described below, the clarified geothermal fluid comprised of about 90 percent by weight brine and about 10 percent by weight steam as produced from a production well at a temperature of 455° F. and a pressure of 400 p.s.i.g was used. The brine contained a total of about 251,000 weight parts per million of various elements dissolved therein: less than 0.3 aluminum, 0.2 silver, 1.0 antimony, 12.8 arsenic, 319 boron, 1,070 barium, 103 bromine, 1.2 cadmium, 25,000 calcium, 149,000 chlorine, 0.06 chromium, 12 cesium, 5.2 copper, 0.4 fluorine, 459 iron, 5 iodine, 13,500 potassium, 1,770 lithium, 49 magnesium, 793 manganese, 50,000 sodium, less than 0.1 nickel, 81 lead, 73 rubidium, less than 1 selenium, 200 silicon, 400 strontium, and 302 zinc.

The apparatus utilized in the tests includes a three inch conduit containing a portal for injecting the acid and along with a first corrosion/scale inspection spool and a static mixing spool. The static mixer is a 12 inch section of conduit housing a helix formed of stainless steel through which the fluid is forced as it moves along the three-inch conduit to provide the turbulence needed to thoroughly mix the acid into the brine. The pH of the brine is measured above and below the acid mixing spool. The brine next enters an agitation spool packed with a metal higher in the electromotive series than silver for a distance of about 24 inches. After passing through the packed spool, the brine was (in some tests) filtered through a cartridge filter and then exited the system through a second corrosion/scale inspection spool. The two corrosion/scaling spools are sections of conduit which hold conventional carbon steel corrosion strips to monitor the corrosiveness of brine upstream and downstream of the acid injection point. The second corrosion/scale spool was of a length sufficient to provide a total residence time of about 1 minute for the brine flowing through the test apparatus. At the exit from a simulated injection conduit the brine is normally at a temperature within the range of from about 50° F. to 400° F. and more typically at a temperature of from about 200° F. to 350° F. In tests with acidified brine, sufficient concentrated hydrochloric acid is added to achieve and maintain a concentration of about 20 ppm, which was sufficient to lower the pH to about 4.9.

Scale buildup on the piping can be measured by gamma radiographic techniques employing an Iridium 92 source; the source and film plate being positioned on opposite sides of the area of interest. The differences in gamma absorption of the brine, scale and steel results in sufficient contrast to produce a radiograph from which projected thickness of scale can be measured. At the conclusion of each of tests 1 through 11, the packings were removed and inspected, with the results observed being discussed below and summarized in Table I.

Test 1. This was a baseline test in which the center spool was left empty and the total brine flow was 1.44 MMlb. Average suspended solids in the brine was 30 ppm upstream and 33 ppm downstream of the center spool. Scales deposited in the three spools consisted primarily of copper and iron with the center spool scale having a silver concentration of about 84 oz/ton.

Test 2. The center spool which was packed with steel wool pads became completely plugged after about 2 hours of operation. Solids removed from the compacted pads were rich in copper and iron.

Test 3. Test 1 was repeated with the center spool being filled with ⅜ inch diameter carbon steel ball bearings of a size sufficient to increase the available scale deposition area by about a factor of 6 as compared to the unpacked spool and the run continued for 120 hours. At the conclusion of this time, the suspended solids had slightly increased from about 45 ppm upstream to about 52 ppm downstream. The brine analyses showed that the concentrations of silver, antimony and copper were all reduced in the center spool. The deposited scale on the balls was rich in copper, iron and arsenic. The scale deposited on the balls had silver, gold and platinum concentrations of about 408, 0.0.41 and 0.0035 oz/ton respectively. As seen in test 5 below, the silver recovered in this test was only about 46 percent of that recovered when the brine was acidified according to the present invention.

Test 4. Test 1 was repeated with the center spool being repacked with mossy zinc chips. The center spool completely plugged after about 4 hours of operation. Scale recovered from the zinc chips was primarily comprised of arsenic, copper and lead.

Test 5. Test 1 was repeated with the center spool being packed with a mixture of steel balls and mossy zinc chips and with the brine being acidified with hydrochloric acid. The center spool scaling rate was slightly higher than that observed in Test 1 while the downstream scaling rate was considerably lower. The upstream suspended solids concentration was about 76 ppm while that down stream was only about 41 ppm, i.e., there was a substantial decrease. The silver, gold and platinum concentrations in the scale were 892, 0.0.008 and 0.0023 oz/ton respectively.

Test 6. Test 1 was repeated with the center spool being repacked with coiled steel chicken wire mesh galvanized with a layer of zinc on the surface thereof. While the rate of upstream scaling was basically similar to that in Test 1, the down stream rate was considerably lower. The wire collected approximately 2000 ppb of material with the average suspended solids being 52 ppb upstream and 78 ppb downstream, i.e., the suspended particle concentration increased. This may be due to small flakes of zinc and iron corrosion products spalling off during the test. The amount of silver, gold and platinum in the scale was 646, 0.008 and 0.0023 oz/ton respectively. Chicken wire mesh is cheap and, therefore, expendable. The scaled wire can be sold directly to a metal reclaimer without any supplemental leaching or other chemical or mechanical cleaning operation being required.

Test 7. Test 6 was repeated with the brine being acidified with hydrochloric acid and with a cartridge filter being inserted between the packed spool and the downstream unpacked spool. This test ran for the full 120 hours as compared to just 23 hours in a comparison test using just the filter alone. The concentration of silver, gold and platinum in the scale was 350, 0.004 and 0.014 oz/ton respectively. Although these results are lower than those observed with unacidified brine, an analysis of the clarified brine provided showed that the concentrations of precious metals therein were noticeably lower than was the case with tests 1–6. Particulate concentrations were also very low (20 ppm) and the downstream scaling was somewhat greater than that observed upstream. This difference was a result of a change in the source of brine (the brine was obtained from a different well). The remaining tests 8 to 12 also utilized this same brine source. The deposit in the filter was mainly barite, silica and fluorite.

Test 8. Test 1 was repeated with the packing being lead wire. Scale deposition upstream of the lead wire was about the same as that observed downstream. The scale on the lead wire showed concentrations of 359, 0.002 and 0.016 oz/ton for silver, gold and platinum, respectively.

Test 9. Test 8 was repeated with the brine being acidified with hydrochloric acid. The silver recovery was only slightly lower than in test 8 and the remainder of the test results were essentially identical.

Test 10. Test 1 was repeated with the center spool being packed with copper wire. While the test run lasted the full 120 hours, the recovery of silver, gold and platinum was lower than that observed with the lead wire. From this, it appears that the less noble the packing metal, the better the recovery of precious metals in the brine. Scaling in both the upstream and downstream spools was essentially the same but the concentration of suspended material was slightly higher downstream. As reported in test 11 below, the amount of silver recovered was about 75 percent less than was recovered when the brine was acidified according to the present invention.

Test 11. Test 10 was repeated with the brine being acidified with hydrochloric acid. The amount of silver recovered was considerably higher than in Test 10, but were still below the amounts recovered in either of the lead wire tests. As in Test 10 upstream and downstream scaling rates were about the same but the downstream concentration of suspended material was considerably higher than that observed upstream from the packing. Since the scale can be removed from the wire merely by twisting it, it appears that, with acidified brine, the scale does not adhere tightly to the packing wire, and the normal vibration of the system may be enough to knock some of it off during the displacement operation.

Test 12. To determine the effect of the present invention on the corrosivity of the treated brine, a test substantially as described in Test 7 and using the same brine source as in Test 7 was conducted utilizing two sets of corrosion coupons. Each set comprised ten 2"×4" coupons having circular weld beads thereon. The coupons were formed from a variety of different metal compositions. One set was placed upstream of the acid injection point and the other set placed downstream of the packed spool. During the test about 20 ppm of hydrochloric acid was injected upstream of the packed spool to reduce the pH of the brine from about 5.5 to about 5.0. The test duration was 33 days. At the conclusion of the test the coupons were examined, and an estimate of general corrosion rates was made based on weight loss measurements. For the pitting weight loss, the depth of the deepest pit was measured, and the weight loss was calculated on the basis of what it would have been had metal been uniformly removed from the coupon to that measured depth. The results of this test are set forth in Table II.

TABLE I

COMPARISON OF TEST RESULTS USING A PACKED AGITATION SPOOL WITH ACIDIFIED AND UNACIDIFIED CLARIFIED GEOTHERMAL BRINES

| Example Number | Metal Packing | Suspended Solids Upstream | Suspended Solids Downstream, ppm | Precious Metals Recovery Ag | Precious Metals Recovery Au | Precious Metals Recovery Pt (oz/ton) |
|---|---|---|---|---|---|---|
| 1 | none | 30 | 33 | 84 | | |
| 3 | Mild steel ball bearings No acid | 45 | 52 | 408 | 0.041 | 0.0035 |
| 5 | Ball bearings with Zn chips and acid | 76 | 41 | 892 | 0.008 | 0.0023 |
| 6 | Iron Chicken wire - no acid | 52 | 78 | 646 | 0.008 | 0.0018 |
| 7* | Iron Chicken wire and acid | 26 | 20 | 350 | 0.004 | 0.014 |
| 8* | Lead Wire No acid | 29 | 26 | 359 | 0.002 | 0.016 |
| 9* | Lead Wire and acid | 34 | 29 | 350 | 0.003 | 0.017 |
| 10* | Copper Wire No acid | 21 | 28 | 83 | 0.002 | >0.001 |
| 11* | Copper Wire and acid | 22 | 37 | 318 | 0.001 | 0.019 |

*Different brine source. See explanation in text.

TABLE II

MEASURED CORROSION RATES

| Alloy | Upstream of Acid Weight Loss/Pitting (All Corrosion Rates in MPY) | Downstream of Spool Weight Loss/Pitting |
|---|---|---|
| AISI 1018 mild steel | 277/480 | 250/900* |
| AL 29-4-2 ferritic SS[1] | 18.7/84 | 0.3/6 |
| Type 316L SS | 12.1/24 | 0.1/12 |
| 2205 duplex SS | 11.7/48 | 0.6/24 |
| SAF 2507 duplex SS[2] | 1.9/36 | 0.3/<6 |
| SM 2550 - 110 ksi yield | 1.4/0 | 0.4/0 |
| SM 2035 - 110 ksi yield | 0.8/0 | 0.4/0 |
| 904L SS | 0.6/6 | 0.4/0 |
| Carpenter 20Cb-3 SS | 0.4/12 | 0.1/6 |
| Inconel 625 | 0.3/0 | 0.2/0 |

*This high value results from a single deep crevice in the coupon. The cause of the crevice is not known.
[1]29% Cr, 4% Mo, 2% Ni.
[2]New duplex stainless steel from Sandvik: 25% Cr, 7% Ni, 4% Mo, 0.3% N The results set forth in Table II should not be used to estimate long term corrosion rates or resistance to corrosion cracking, in view of the relatively short exposure time. Nonetheless, they do clearly show that the brine is less corrosive after treatment than it is before treatment, in spite of the addition of acid and the corresponding reduction of pH of the brine.

As noted in the above test description, the difference in the test results observed for tests 6 and 7 appears to be explainable by an unanticipated change in the brine source in the operating plant. At the beginning of these tests, the brine had a nominal pH of about 5.2 and a silver concentration of between about 2.2 and about 2.4 oz/MMlb of brine (0.14 - 0.20 ppmw). However, prior to the start of test 7 and continuing through test 12, the brine source was changed and the copper and precious metals content of the clarified brine were observed to be from 20 to almost 50 percent lower than before. It is also noted that the levels of suspended scale observed in these tests is on the order of about 50% lower as well.

There is no explanation for this difference since the two brine sources are physically located near each other and were expected to be substantially identical in composition. Consequently, the difference in test results observed when unacidified and acidified brines were used, particularly with ball bearings (tests 3 and 5), wherein the amount of precious metals recovered was doubled when the brine was acidified as described hereinabove and copper wire (tests 10 and 11), wherein it was tripled, should be considered as showing more clearly the efficacy of acidifying the brine prior to passing it into the agitation spool.

Referring to Table II it is seen that all of the coupons showed some decrease in corrosion rate in the treated brine as compared to the original brine prior to acidification. The 1018 mild steel did not show a substantial improvement. This is noteworthy, however, for one would have expected to see a dramatic increase in the corrosion rate in a more acidic environment. Some of the chromium alloy coupons which had low corrosion rates initially did not show a substantial improvement in the treated brine, within the limits of the measurement techniques utilized.

Nonetheless, all of the chromium alloy coupons showed a reduction in corrosion rates of at least about 30% and an average reduction in the corrosion rates in excess of about 50% in the treated brine as compared to the feed brine. Further, certain of the chromium alloy coupons which had significant corrosion rates in the feed brine showed an even higher reduction in corrosion rates in the treated brine in spite of the increase in acidity. The AL 29-24-2 ferritic, Type 316L and 2205 Duplex stainless steels not only showed a reduction in corrosion rates in excess of 30% and 50%, but a truly significant reduction in excess of 90% in the acidified treated brine as compared to the feed brine. Type 316L SS would not normally be considered for use in brine applications; however, it is a standard for corrosion against which other materials are judged.

In a commercial scale demonstration test of the method of the present invention, recovery in excess of 50 wt. % of the silver contained in the brine was readily obtained. The percent recovery of pt and Au is generally substantially less than that of silver; however, they are present in the brine in such significantly lower quantities that the lower recovery rate does not have an appreciable adverse effect on the economic benefits obtained by the practice of the invention. While the value of the metals recovered is substantial, the real economic benefit is in the prolonged life of the injection wells. More particularly, at the end of about 32 days the pipe upstream of the brine treatment zone had accumulated a substantial thickness of scale, while the downstream pipe had only a thin film of scale. It was determined that the scale forming potential of the brine was reduced by at least 85% and it is anticipated that by further optimization of operating parameters a reduction of in excess of 90% is obtainable. The savings realized through the extended well life is usually in excess of at least seven times the value of the metals recovered.

EXAMPLE 13

A silver recovery test was conducted at the Imperial Valley geothermal fields of California using one-half inch angle iron stock cut into pieces one inch in length. The pieces of angle iron were placed within a high temperature silver collection spool made of a section of Hastelloy C-276 conduit, 24 inches in length with a two-inch internal diameter. A slotted retainer grate at each end of the section formed a cage for holding the angle iron. The packing material was arranged so that the pressure drop across the high temperature collection spool was initially about 10 p.s.i. A Clayton Mark handle bar union of 3000 pound forged steel having a 45 degree cone to ball metal to metal seating at each end of the conduit section connected the high temperature collection spool into the surface piping of an experimental bench scale brine processing unit which processed a slip stream of brine produced from the IID 12 well located at Salton Sea, Calif.

In the experimental high temperature collection spool system, the brine flows through a test separator designed to simulate a power plant separator by flashing off the non-condensible vapors and steam. The remaining brine advances from the bottom of the test separator through an orifice metering system and a brine level control valve before entering the high temperature collection spool. The pressure on the brine gradually decreases from 350 p.s.i.g. in the test separator to 250 p.s.i.g. after the level control valve to about 150 p.s.i.g. at the downstream end of the high temperature collection spool. Due to the pressure reduction, the one-phase brine flashes to create a two-phase stream before entering the high temperature collection spool. The brine temperature is only reduced to about 350° to 400° F., and the brine flowrate is between about 1,000 to 2,000 pounds per hour.

In tests ranging in duration from 18.5 to 48 hours, it was found that the scales contain as high as 1,539 troy ounces of silver per ton of scale formed. The silver recovery for a single collection spool placed in the brine stream was in the range of 0.5 to 0.6 troy ounces per million pounds of brine. When two collection spools made as described above were placed in series in one of the brine flow conduits, the amount of silver collected was greater than with one spool, the first spool collecting the greater amount of silver. On the average, the total silver recovered in tests using two spools in series was about 0.8 troy ounces per million pounds of brine. Accordingly, for highest rates of silver recovery, a long high temperature spool or two collection spools in series should be placed in the brine flow conduit.

EXAMPLE 14

A high temperature collection spool of the kind used in Example 13 is filled with ⅜ inch diameter carbon steel balls as the packing material. In the first test using this high temperature collection spool, silver recovery was relatively low, only 0.24 troy ounces per million pounds of brine. However in the second and third tests using this high temperature collection spool, when the same steel balls are reused, the increased roughness of the used balls enhances the favorable conditions for silver deposition at the iron-brine interface so that the silver recovery is increased to 0.46 and 0.56 troy ounces per million pounds of brine, respectively, a recovery almost as great as that achieved with angle iron in Example 13. It can be seen from this Example that the condition of the surface of the iron-bearing packing material affects the amount of silver that can be recovered more than the shape of the packing material. Therefore, for best results, high temperature packing material should not be polished to a smooth surface as by machining, or if it has been polished, the metal should be made slightly roughened as by etching with a corrosive fluid and/or by rubbing with an abrasive substance.

EXAMPLE 15

A series of tests are conducted to determine the composition of scales deposited from geothermal brine at the Salton Sea geothermal fields of California. To determine whether the content of silver in the scales depends upon the galvanic reaction with the packing material, half of the tests are conducted using carbon steel balls and half of the tests use ceramic balls as high temperature packing material.

The results of these tests recorded in Table III show that silver in the scales collected using steel balls is increased by as much as ten times over that obtained when ceramic balls are used as the packing material. This result is consistent with the theory that silver deposition proceeds by galvanic reaction. A corresponding increase occurs in the deposition of antimony, arsenic, and copper when the steel balls are used as the packing material. This increase in the antimony, arsenic, and copper content of the scale is consistent with the hypothesis that silver, copper, dyscrasite and a similar silver-arsenic compound also form by galvanic reaction with iron contained in the packing material.

TABLE III

| SCALES RECOVERED FROM GEOTHERMAL BRINE | | | | | | |
|---|---|---|---|---|---|---|
| Analysis | | Carbon Steel Balls | | | Ceramic Balls | | |
| (Wt. %) | Run | 1 | 2 | 3 | 4 | 5 | 6 |
| Ag | | 6.00 | 2.76 | 3.04 | 0.69 | 0.20 | 0.21 |
| As | | 0.26 | 0.37 | 0.35 | 0.05 | 0.03 | 0.04 |
| Cu | | 0.20 | 1.82 | 6.70 | 0.35 | §0.10 | 0.36 |
| Sb | | 2.30 | 3.20 | 2.90 | 0.68 | 0.10 | 0.18 |

EXAMPLE 16

A brine handling process train upstream of a lower temperature contactor was constructed. Train was composed of corrosion resistant and non-precious metal reacting materials. Materials of construction included Hastelloy and polymer concrete lined pipe for process train portions upstream of a contactor spool. Mild steel was used for downstream process piping. Although mild steel was used for upstream components, mild steel contact with upstream brine was avoided.

Acid was injected into the brine prior to major heat extraction process steps (i.e., pressure and temperature reducing within flash vessels), reducing the pH of the feed brine from about 6.0 to about 5.2. After flashing and near the injection well, the pH of the lower temperature location brine was about 5.0. Temperature at this near injection well location was about 360° F. Brine pressure was about 200 psig.

A contactor spool containing coiled mild steel wire packing was installed at this near injection well location. The contactor spool and packing were similar in construction to the test spool described in Test Example 7. Brine flowrates were also similar to that described in Example 7. Residence time within the contactor spool varied, but was estimated as about ½ minute and generally no more than one minute, while total transit time from production well to the contactor spool near injection well was estimated at 6 minutes.

After approximately 15 days of brine flow operation, analysis was performed on samples of the scale formed/collected by the contactor spool as well as scale samples collected upstream and downstream of the contactor spool. The scale in the contactor consisted of 60 wt % silver, 25 wt % silica, and less than 5 wt. percent antimony and gold each. No copper or barite was detected, and reduced amounts of arsenic were detected. In contrast, upstream of the contactor, essentially no gold or silver were detected. Downstream scale was generally composed of silica which deposited at a rate of 750 mpy. Corrosion rates were not determined in this test. The feed brine concentration of silver was 0.25 ppm, while gold was 0.16 ppm. Discharge brine from the outlet of the contactor had a concentration of silver of less than 0.10 ppm, while gold was less than 0.01 ppm. These concentrations are estimated to be less than 50 percent of the saturation concentrations of these constituents at the aforesaid conditions.

While particular embodiments of the invention have been described, it will be understood that the invention is not limited thereto since many obvious modifications can be made. It is intended to include within this invention any such modifications as will fall within the scope of the appended claims.

What is claimed is:

1. A method for treating a corrosive feed geothermal brine containing suspended and dissolved scale forming constituents at least some of which comprise silicon-containing components and some of which comprise at least one recoverable metal selected from the group consisting of copper and metals below copper in the electromotive series said method comprising passing the brine through a conduit packed with at least one metal as high or higher in the electromotive series than copper for a time sufficient for a substantial portion of the recoverable metal to precipitate onto the packing in said conduit, to reduce the corrosivity of the brine, and to stabilize the scale forming constituents of the brine; and discharging from said conduit a treated brine less corrosive than the feed brine and having a substantially reduced scale forming potential.

2. The method of claim 1 wherein said higher electromotive series metal is selected from the group consisting of steel, zinc, iron, nickel, cobalt, cadmium, lead and copper, and alloys thereof.

3. The method of claim 2 wherein said recoverable metal comprises one or more metals selected from the group consisting of copper, silver, gold and platinum.

4. The method of claim 2 wherein the form of said metal packing is selected from coiled piano wire, coiled chicken wire mesh, small balls and flakes.

5. The method of claim 2 wherein said metal packing is steel chicken wire mesh galvanized with a layer of zinc on the surface thereof.

6. The method of claim 1 wherein said brine is injected into a deep well after it leaves said packed conduit.

7. The method of claim 1 wherein said recoverable metal comprises silver.

8. The method of claim 1 wherein the residence time of said brine in said packed conduit is from a bout ½ to about 5 minutes.

9. The method of claim 1 wherein said recoverable metal comprises copper and silver.

10. The method of claim 9 wherein in excess of about 50 weight percent of the silver contained in the feed brine is collected in the packed conduit.

11. The method of claim 9 wherein the corrosivity, based on weight loss, of the feed brine with respect to a corrosion coupon consisting of AL29-4-2 ferritic stainless steel, is reduced by at least 90% as compared to an untreated feed brine.

12. The method of claim 1 wherein said brine is clarified to remove at least a portion of said silicon-containing components therefrom before being passed through said packed conduit and the brine received from said packed conduit contains trivalent metal cations.

13. The method of claim 1 wherein the corrosivity based on weight loss, of the feed brine with respect to a corrosion coupon consisting of type 316L SS, is reduced by at least 90% as compared to an untreated feed brine.

14. The method of claim 1 wherein the scale forming potential of the feed brine is reduced by at least about 85% as compared to the treated brine.

15. A method of treating a feed brine comprising: passing the feed brine through a conduit packed with at least one metal higher in the electromotive series than copper and discharging the treated feed brine from the conduit, the treated brine being less corrosive than said feed brine.

16. The method of claim 15 wherein said passing through said packed conduit occurs over a residence time from about ½ to about 10 minutes.

17. A method of treating a corrosive feed geothermal brine said method comprising passing the feed brine through a conduit packed with at least one metal higher in the electromotive series than copper for a time sufficient to reduce the corrosivity of the feed brine and discharging a brine of reduced corrosivity.

18. A method for treating a brine to reduce its scale forming potential said brine containing suspended solids and dissolved scale forming constituents at least some of which comprise silicon-containing components said method comprising passing the brine containing scale forming constituents through a conduit packed with at least one metal as high or higher in the electromotive series than copper for a time sufficient to stabilize the scale forming constituents in the brine and discharging the brine of potentially reduced scale forming potential and decreased corrosivity.

19. The method of claim 18 wherein said higher electromotive series metal is selected from the group consisting of steel, zinc, iron, nickel, cobalt, cadmium, lead and copper, and alloys thereof.

20. The method of claim 19 wherein said metal packing is steel chicken wire mesh galvanized with a layer of zinc on the surface thereof.

21. The method of claim 18 wherein said brine is clarified to remove at least a portion of said silica therefrom before being passed through said packed conduit.

22. The method of claim 21 wherein said brine is injected into a deep well after it leaves said packed conduit.

23. The method of claim 22 wherein said silicon containing component comprises silica, trivalent iron and trivalent manganese.

24. A method for treating a corrosive geothermal feed brine containing at least one recoverable metal selected from the group consisting of copper and metals below copper in the electromotive series said method comprising passing the brine through a conduit packed with at least one recoverable metal as high or higher in the electromotive series than copper for a time sufficient to precipitate a substantial portion of the recoverable metal in the packed conduit and discharging from the conduit a brine less corrosive than the feed brine.

25. The method of claim 24 wherein said recoverable metal comprises one or more metals selected from the group consisting of copper, silver, gold and platinum.

26. The method of claim 24 wherein said recoverable metals comprise copper and silver.

27. The method of claim 24 wherein said higher electromotive series metal is selected from the group consisting of steel, zinc, iron, nickel, cobalt, cadmium, lead and copper, and alloys thereof.

28. The method of claim 24 wherein said metal packing is steel chicken wire mesh galvanized with a layer of zinc on the surface thereof.

29. The method of claim 26 wherein in excess of 50 weight percent of the silver contained in the feed brine is collected in the packed conduit.

30. The method of claim 29 wherein said brine is injected into a deep well after it leaves said conduit.

31. A method for treating a feed geothermal brine containing at least one recoverable metal selected from the group consisting of copper and metals below copper in the electromotive series said method comprising passing the feed brine through a conduit packed with at least one metal higher in the electromotive series than copper for a time sufficient for the corrosivity of the brine to decrease and a substantial portion of the recoverable metal to precipitate onto the packing in said conduit and recovering the precipitated metal.

32. The method of claim 31 wherein said recoverable metal comprises one or more metals selected from the group consisting of copper, silver, gold and platinum.

33. The method of claim 31 wherein said recoverable metal comprises silver.

34. The method of claim 31 wherein said metal packing is steel chicken wire mesh galvanized with a layer of zinc on the surface thereof.

35. The method of claim 33 wherein in excess of about 50 weight percent of the silver contained in the brine is collected in the packed conduit.

36. A method for treating a corrosive feed geothermal brine containing scale forming constituents, at least some of which comprise silicon-containing components to reduce its corrosivity and scale forming potential said method comprising passing the feed brine through a conduit packed with at least one metal higher in the electromotive series than copper for a time sufficient to reduce the corrosivity of the brine and stabilize the scale forming constituents contained therein, and discharging from said conduit a brine substantially less corrosive than the feed brine and having a substantially reduced scale forming potential.

37. A method for treating a feed geothermal brine containing suspended and dissolved scale forming constituents at least some of which comprise silicon-containing components and some of which comprise at least one recoverable metal selected from the group consisting of copper and metals below copper in the electromotive series said method comprising passing the brine at through a conduit packed with at least one metal higher in the electromotive series than copper for a time sufficient for a substantial portion of the recoverable metal to precipitate on to the packing in said conduit, and to stabilize the scale forming constituents of the brine; and discharging from said conduit a treated brine having a substantially lower scale forming potential and corrosivity.

38. The method of claim 37 wherein said recoverable metal comprises silver.

39. The method of claim 37 wherein said metal packing is steel chicken wire mesh galvanized with a layer of zinc on the surface thereof.

40. The method of claim 39 wherein said brine is clarified to remove at least a portion of said silicon-containing components therefrom before being passed through said packed conduit and the brine received from said packed conduit contains trivalent metal cations.

41. The method of claim 40 wherein said treated brine is injected into a deep well having a useful life at least three times longer than if said feed brine were injected absent said packed conduit.

42. The method of claim 41 wherein said silicon-containing component comprises silica.

43. The method of claim 41 wherein said silicon-containing component comprises silica, trivalent iron and trivalent manganese.

* * * * *

UNITED STATES PATENT AND TRADEMARK OFFICE
CERTIFICATE OF CORRECTION

PATENT NO. : 5,240,687
DATED : August 31, 1993
INVENTOR(S) : Gallup et al.

It is certified that error appears in the above-identified patent and that said Letters Patent is hereby corrected as shown below:

Claim 37, column 28, line 15, after "brine" delete "at."

Signed and Sealed this

Twenty-ninth Day of March, 1994

Attest:

BRUCE LEHMAN

Attesting Officer     *Commissioner of Patents and Trademarks*